United States Patent [19]

Tomuro

[11] 4,352,244

[45] Oct. 5, 1982

[54] STRAIGHTLY EXTENSIBLE MEASURING TAPE

[76] Inventor: Yasushi Tomuro, No. 11-3, Tamagawa Denencho-fu 2-Chome, Setagaya-ku, Tokyo, Japan

[21] Appl. No.: 151,106

[22] Filed: May 19, 1980

[30] Foreign Application Priority Data

Jun. 15, 1979 [JP] Japan .................................. 54-74600

[51] Int. Cl.³ .............................................. G01B 3/10
[52] U.S. Cl. .................................................. 33/137 R
[58] Field of Search .................. 33/137, 138, 139, 140

[56] References Cited

U.S. PATENT DOCUMENTS 2,050,941 8/1936 Farrand ............................. 33/137 R
3,073,544 1/1963 Cirves et al. ...................... 33/138 X

FOREIGN PATENT DOCUMENTS 104305 7/1899 Fed. Rep. of Germany ........ 33/138

*Primary Examiner*—Harry N. Haroian
*Attorney, Agent, or Firm*—Michael J. Striker

[57] ABSTRACT

This invention relates to a straightly extensible measuring tape which can maintain a straight extension when it is extended. It comprises a curvature portion having a larger arc than a semicircle at section of a width direction of the measuring tape under a forceless state when it has been extended, and a flattened portion integrally formed with the curvature portion. Consequently, the measuring tape of this invention is able to be wound or extended at one's option by using a preferred winding means.

4 Claims, 9 Drawing Figures

STRAIGHTLY EXTENSIBLE MEASURING TAPE

BACKGROUND OF THE INVENTION

This invention relates to a straightly extensible measuring tape which can maintain a straight extension when it is extended longer.

Out of various kinds of measuring tapes there are measuring tapes which are made of a metal material and provided with a curvature portion to a width direction relative to an extensible direction of the tape. However, the length of a straight extension of the measuring tape is very short. According to a conventional measuring tape of the above structure, the length of the measuring tape which can maintain a straight extension is normally no more than about several ten centimeters. In order to overcome the above disadvantage, there is on the market a measuring tape in which its width is widened up to a degree of 25 mm, its thickness is increased a little bit and its curvature rate is about 26φ at an arc section to a width direction when the measuring tape is extended. This measuring tape maintains a straight extension of more than 1 meter in case it is extended from an opening of a measuring case, but its disadvantage is that the measuring tape itself becomes larger and the measuring device becomes heavier.

In view of the above disadvantage of a conventional art, this invention has been achieved.

BRIEF SUMMARY OF THE INVENTION

It is therefore a general object of this invention to provide a measuring tape which can maintain a straight extension even if it is extended longer by 3 meters, 5 meters or 7 meters.

So far, a straight extension of such a long distance has not been attained in the conventional measuring tape.

From this point of view, the inventor has solved the above task by characterizing that the measuring tape of this invention comprises, under a forceless condition when it is extended, a curvature portion having a larger arc than a semicircle at section of a width direction of the measuring tape, and a flattened portion formed integrally with the curvature portion.

Generally, the material of the measuring tape is made of a desired organic synthetic resin, steel, invar or the like. Those materials are acceptable for the material of the measuring tape of this invention, but it is particularly preferably made of a stainless steel, a spring steel or a phosphor bronze.

The structure that the curvature portion and the flattened portion are formed integrally is preferably made by means of roll forming. This roll forming method can provide a very thin and narrow tape material with an accurate curvature as desired. This accurate roll forming of the curvature portion prevents the measuring tape in use from twisting. That is, in use of this measuring tape, it never be twisted when it is extended. This is one of the most important properties which is required for all the measuring tapes. Accordingly, the measuring tape of this invention can make its thickness thinner than that of a conventional measuring tape and maintain a straight extension without any twisting at the time when it is extended longer.

Other and further objects, features and advantages of this invention will be more fully from the following description taken in connection with the accompanying drawings.

BRIEF DESCRIPTION OF THE ACCOMPANYING DRAWINGS

PREFERRED EXAMPLES OF THE INVENTION

Preferred examples of this invention will now be described in connection with the accompanying drawings.

Figure 1:
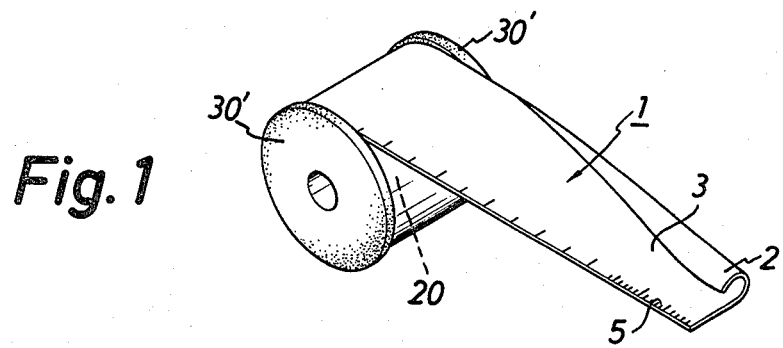
FIG. 1 is a perspective view of an example of a straightly extensible measuring tape according to this invention.

In FIG. 1 there is shown a straightly extensible measuring tape 1 according to this invention. The measuring tape 1 includes, under a forceless condition when extended, a curvature portion 2 having a larger arc than a semicircle at section of a width direction of the measuring tape, and a flattened portion 3 formed integrally with the curvature portion 2.

Figure 2:
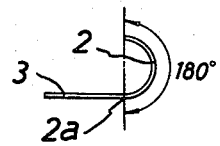
FIGS. 2 to 4 are respective section views showing examples of a sectional profile of the above measuring tape in a width direction, when the tape is extended from the casing.

The material of the measuring tape 1 of this example is preferably made of a thin tape-type steel material (for example, a stainless steel of several hundred mikrons at thickness), wherein the curvature portion 2 is obtained by pressing this tape-type steel material by means of roll forming. The side section of the measuring tape 1 to a width direction forms the curvature portion 2 at one end of a longitudinal direction of the measuring tape and the flattened portion 3 provided to a tangent direction of an edge 2a which is formed integrally with the curvature portion 2. As shown in FIG. 2, the side section of the measuring tape 1 is of J-shape.

Figure 4:
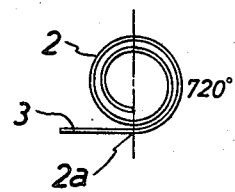

Preferably, the curvature portion 2 is to be a larger arc than a semicircle but a smaller one than double circles. As shown in FIGS. 2 and 4, there is shown a side section view of the measuring tape to a width direction. The reason why the arc of the curved portion 2 should be larger than a semicircle, but smaller than double circles is that its range is most suitable as the results of research and experiments.

Figure 5:
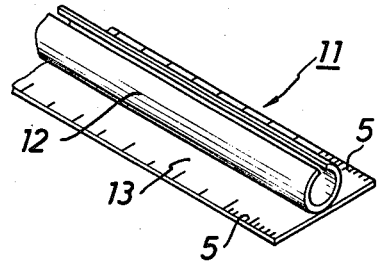
FIG. 5 is a perspective view of another example of a straightly extensible measuring tape according to this invention.
Figure 3:
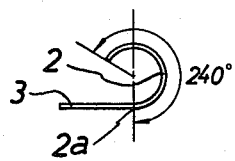

In FIG. 5 there is shown another measuring tape 11 comprising a curvature member 12 of tubular shape and a flattened member 13 independently thereof. The tubular member 12 having a given curvature is firmly fixed with the flattened member 13 on a center line thereof.

The curvature of the tubular member 12 is given by means of a roll forming method.

Figure 6:
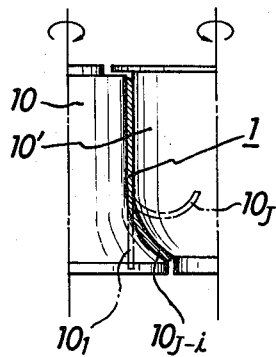
FIG. 6 is a detail view of a roll forming process of the straightly extensible measuring tape according to this invention.

An example of the roll forming method will now be described in connection with FIG. 6. In this example, there are shown a pair of rolls 10, 10'. Firstly, a tape-shape metal material 10$_l$ (illustrated by a dot-and-dash-line) having a certain width is inserted into a gap between the two rolls 10, 10'. In a nearly intermediate position of the roll forming the gap therebetween is deformed into a sectional shape 10<sub>j-i</sub> (illustrated by a full line) and finally into a sectional shape 10<sub>j</sub> (illustrated by a dot-and-dash line). If necessary, the measuring tape of this invention can be treated with a thermal treatment during the roll forming process.

The measuring tape 1 or 11 comprising the curvature portion and the flattened portion is provided with a graduation 5 along one or two longitudinal edges of the flattened portion 3 or 13. Likewise, a rear face of the flattened portion 3 or 13 can be provided with the graduation 5. Moreover, it is possible to form the graduation 5 or other mark on the curvature portion 2 or 12.

Figure 7:
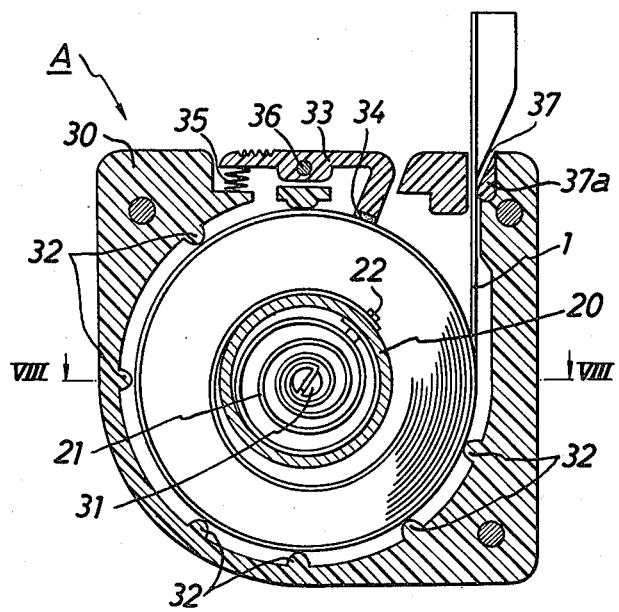
FIG. 7 is a section view of a measuring tape device in which the measuring tape of this invention is incorporated.
Figure 8:
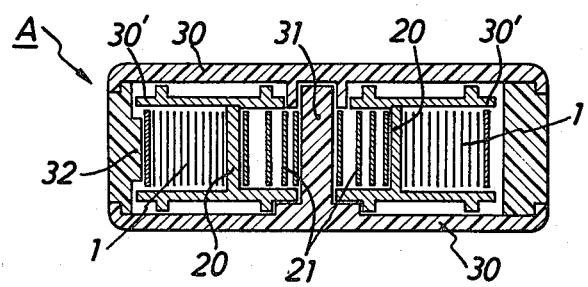
FIG. 8 is a section view taken on line VIII—VIII of FIG. 7.

When the measuring tape 1 (or 11) having integrally the curvature portion 2 (or 12) and the flattened portion 3 (or 13) is wound about a winding frame 20 as shown in FIGS. 1 and 8 respectively, the curvature portion 2 (or 12) which is forced to be flattened by a winding force is going to return to its originally curved shape formed at the time when it has been formed between the rolls. In other words, the wound tape 1 (or 11) store repulsion for returning to the originally curved shape. On the other hand, within the winding frame 20 of a measuring device A (FIG. 7) there is incorporated a spring means 21 having a certain torque capable of coping with the above repulsion, thereby the tape 1 being wound by the spring means 21. The spring means 21 is replaceable with a constant force spring.

FIGS. 7 and 8 are respective section views of the measuring device A in which the measuring tape according to this invention is incorporated.

The measuring tape 1 is mounted in the measuring device A and its curvature portion 2 of the tape 1 is wound about the winding frame 20. Then, it is not necessary to give the tape 1 a specific winding propensity to a longitudinal direction thereof. Thus, the winding frame 20 having wound the tape 1 is mounted rotatably about a pin 31 of a casing 30. The pin 31 is integrally associated with the casing 30. And a rotation of the winding frame 20 is controlled by the spring 21. That is, an inner end of the tape 1 is fixed with an outer end of the spring 21 by way of a pin 22, while an end of the spring 21 is fixed with the pin 31. In this way, a winding torque of the spring 21 is confronted with an extending torque (repulsion) of the tape 1. Preferably, the winding torque of the spring 21 is set greater than the latter. Numeral 30' is a flange mounted on the outer periphery of the winding frame 20. This is to control a width of the tape 1 which may be released due to its proper repulsion. Moreover, it is suitable to control the friction force of the outermost tape 1 by mounting a plurality of projections 32 on an interior of the casing 30. Under the above construction, the tape 1 is set to be stopped at a suitably extended position in relationship of the winding torque of the spring 21 with the extending torque of the tape 1. Numeral 33 is a brake for preventing the tape 1 from automatically extending or withdrawing when either of the above two torques overcomes the other one. The brake 33 has a brake shoe 34 for braking the outer surface of the tape 1 and giving a friction resistance to it, a spring 35 and a pin 36. Further, it is one's option to mount on a side of an opening 37 of the casing 30 a guide member 37a for assisting flattening of the curvature portion 2.

In the measuring tapes 1 and 11 as shown in FIGS. 1 and 5, the flattened portion 3 or 13 itself can be constituted with a spring or a constant force spring. In this case, it is not required to mount a winding means separately, so that the overall structure can be constructed simply. Further, it is possible to form a curvature portion to a width direction on the flattened member 13. When the measuring tape 11 having the curvature member 12 and the flattened member 13 separately is wound, the former and the latter are wound simultaneously and flattened under the condition of lying one upon another. Then, there is caused a difference between the length of the curvature member 12 and the length of the flattened member 13. Accordingly, the former should be jointed to the latter by rivets so as to enable to absorb the above difference.

Figure 9:
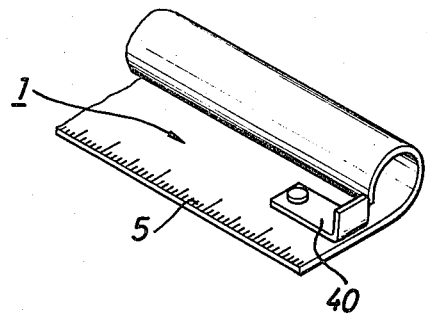
FIG. 9 is a perspective view of the measuring tape of this invention, on which flattened portion is mounted a locking means.

FIG. 9 shows the measuring tape 1 on which is mounted a locking means 40 at its end. The locking means 40 of a hook-shape or a magnet-type can be fixed with a preferred position in order to make easy a measuring operation.

As described previously, even if the measuring tape according to this invention is extended so long, it can maintain a straight extension without any deflection or twisting. Therefore, a considerably longer distance or a water depth can be measured easily by one person by using the measuring tape of this invention.

A suitable example of the measuring tape 1 (or 11) of this invention is that it is made of a stainless steel having the thickness 0.05 mm and the width 30 to 50 mm. When a curvature radius of the curvature portion 2 (or 12) is 6 mm, the measuring tape demonstrates a straight extension even if it is extended by 5 meters. Moreover, even if a vertically, straightly extended measuring tape of this invention is accidentally fallen on a ground, it is not damaged because of its strong material. Accordingly, its utilization effect is enhanced remarkably. Still further, it is one's option that the measuring tape of this invention constitutes partially or as a whole a winding spring including a constant force spring, so that there is obtained the effect furnishing the measuring tape itself a winding function.

What is claimed is:

1. A straightly extensible measuring tape, comprising an elongated element to effect measuring, said element being adapted to be extended from a flattened wound position to an extended position so that the element maintains a straight extension, said element upon being extended from its wound position forming along the extended position a cross-sectional shape having a flattened portion and a curved portion contiguous with said flattened portion, throughout the entire extended length, said curved portion being continuously formed during the extending of the tape without a need to apply a curve-forming force thereto and being flattened when the element is retracted to said wound position and said curved portion forming an arc of at least 180°.

2. A straightly extensible measuring tape according to claim 1, wherein said flattened portion is provided with a locking means on its end portion.

3. A straightly extensible measuring tape according to claim 1, wherein said curved portion and said flattened portion extend in a longitudinal direction along opposed side ends defined by opposed side ends of said element, said curved portion and said flattened portion being formed integrally each other.

4. A straightly extensible measuring tape according to claim 1, wherein said flattened portion is calibrated to effect taking measurements therewith.

* * * * *